Patented Feb. 27, 1940

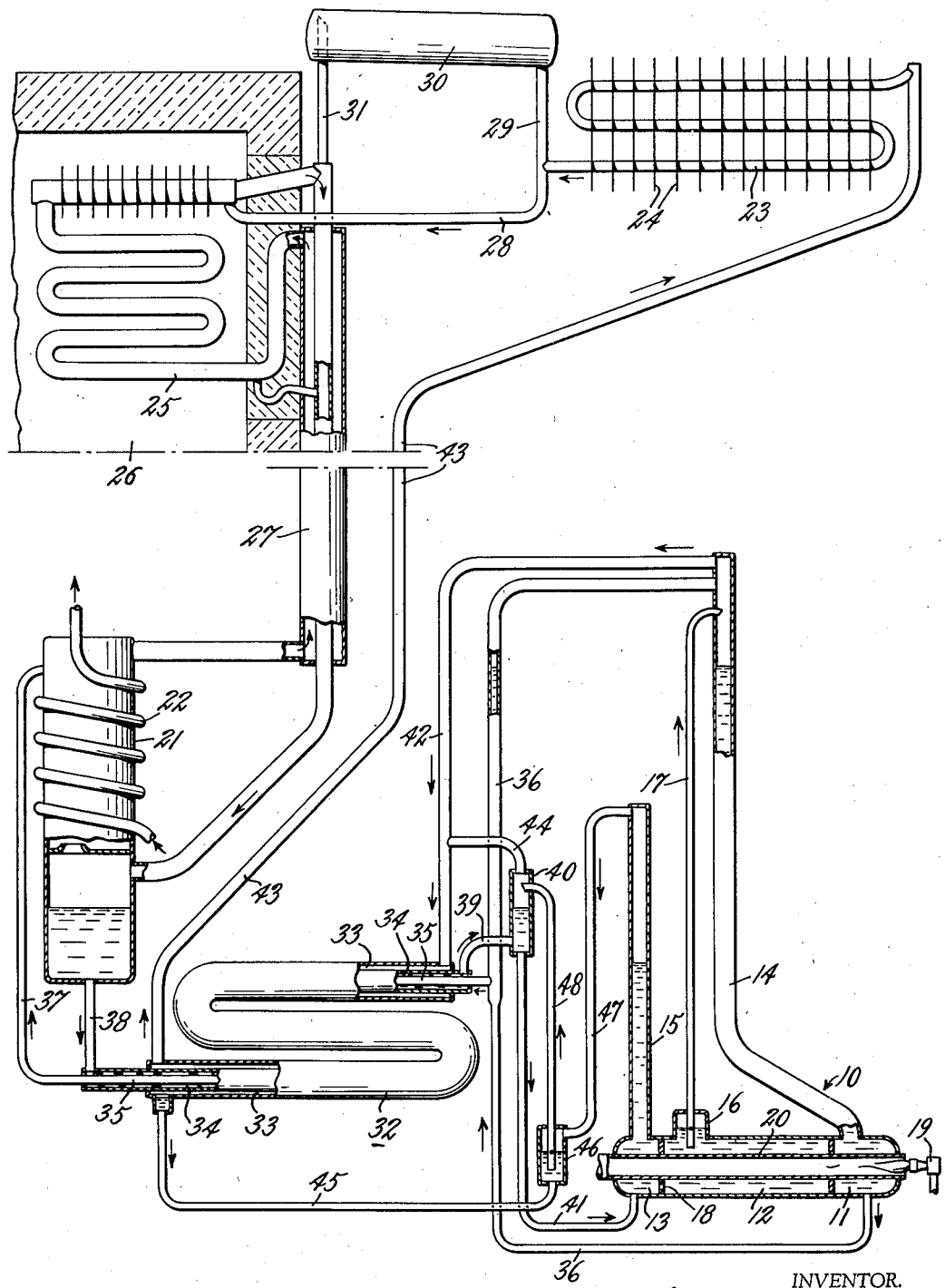

2,191,551

UNITED STATES PATENT OFFICE 2,191,551

REFRIGERATION

Hugo M. Ullstrand, Evansville, Ind., assignor to Servel, Inc., New York, N. Y., a corporation of Delaware Application April 7, 1938, Serial No. 200,572

4 Claims. (Cl. 62—119.5)

My invention relates to an absorption refrigeration system and it is an object of the invention to provide such a system having greater efficiency.

The single figure of the drawing shows more or less diagrammatically an absorption refrigeration system of a type making use of auxiliary pressure equalizing fluid.

A generator 10 has a horizontal portion divided into three chambers 11, 12, and 13. Chamber 11 is provided with a standpipe 14. Chamber 13 is provided with a standpipe 15. Chamber 12 is provided with a dome 16. A thermosyphon or vapor liquid lift conduit 17 is connected from chamber 12 to the upper part of standpipe 14. The lower end of conduit 17 projects downward through dome 16 into chamber 12. Chambers 12 and 13 communicate with each other through a small opening 18. The generator is heated by a gas burner 19 arranged so that the flame is projected into the end of a flue 20 which extends through the horizontal portion of the generator.

An absorber 21 is provided with a cooling coil 22. Coil 22 may be connected to an air cooled condenser, not shown, forming therewith a vaporization-condensation circuit for cooling of the absorber. The absorber may also be water cooled or direct air cooled.

A condenser 23 comprises a pipe coil provided with heat transfer fins 24 for direct air cooling. An evaporator 25 comprises a pipe coil located in an insulated refrigerator storage compartment 26.

The evaporator 25 and absorber 21 are interconnected for circulation of gas therethrough and therebetween by members including a gas heat exchanger 27. The lower end of condenser 23 is connected by a conduit 28 to the upper end of evaporator 25. Conduit 28 conducts liquid from the condenser to the upper part of the evaporator.

The lower end of condenser 23 is also connected to the evaporator-absorber gas circuit by a conduit 29, gas storage vessel 30, and conduit 31. Vessel 30 is usually referred to as a pressure vessel.

The generator 10 and absorber 21 are interconnected for circulation therethrough and therebetween of liquid by members including a triple heat exchanger 32. This triple heat exchanger may be formed as shown by three concentric tubes providing an outside passage 33, a middle passage 34, and an inner passage 35. Generator chamber 11 is connected by a conduit 36 to one end of inner passage 35 of the heat exchanger 32. Conduit 36 is also connected to the upper end of standpipe 14 so as not to form a gas trap. The other end of the inner passage 35 is connected by a conduit 37 to the upper part of absorber 21.

The lower part of absorber 21 is connected by a conduit 38 to one end of middle passage 34 of heat exchanger 32. The other end of middle passage 34 is connected by a conduit 39 to the lower part of a vessel 40. The lower part of vessel 40 is connected by a conduit 41 to generator chamber 13.

The upper end of generator standpipe 14 is connected by a conduit 42 to one end of outside passage 33 of heat exchanger 32. The other end of passage 33 is connected by a conduit 43 to the upper end of condenser 23. The upper part of vessel 40 is connected by a conduit 44 to conduit 42.

The lower end of outside passage 33 is connected by a conduit 45 to the lower part of a vessel 46. The upper part of vessel 46 is connected by a conduit 47 to the upper end of generator standpipe 15. Vessel 46 is connected to the upper part of vessel 40 by a thermosyphon or vapor liquid lift conduit 48. The lower end of conduit 48 projects downward into vessel 46.

The system contains refrigerant fluid, liquid absorbent, and auxiliary inert fluid. These fluids may be ammonia, water, and hydrogen, respectively. Other suitable fluids may be used.

In operation, the generator 10 is heated by the gas burner 19. The burner may be controlled by a thermostat, not shown, responsive to temperature affected by the evaporator 25. Other suitable heating means may be used, such as an electric heating element or liquid fuel burner. Ammonia vapor is expelled from solution in chambers 11, 12 and 13 of the generator 10 by heat from the burner 19. Vapor expelled in chamber 11 rises through standpipe 14 to the upper end thereof and then enters conduit 42. Vapor expelled in chamber 12 accumulates in dome 16 and rises through conduit 17 causing upward flow of liquid from chamber 12 into the upper part of standpipe 14. Vapor issuing from the upper end of conduit 17 in standpipe 14 also enters conduit 42. Liquid removed from chamber 12 is replaced through opening 18 from chamber 13. Vapor expelled from solution in chamber 13 rises through liquid into the upper part of standpipe 15. This vapor flows from the upper part of standpipe 15 through conduit 47 into vessel 46. Vapor rises from vessel 46 through conduit 48 into the upper part of vessel 40, causing upward flow of liquid from vessel 46 into vessel 40. Vapor flows from vessel 40 through conduit 44 into conduit 42. Flow of liquid through the generator 10 is from chamber 13 to chamber 12 and thence into standpipe 14 and chamber 11. Concentration of ammonia in solution is less in chamber 11, greater in chamber 12, and greatest in chamber 13. The temperatures of these chambers increases in the reverse order.

Liquid flows from the weak liquid chamber 11 through conduit 36, inner passage 35 of heat exchanger 32, and conduit 37 into the upper part of absorber 21. Liquid flows downward in the absorber. Liquid flows from the lower part of absorber 21 through conduit 38, middle passage 34 of heat exchanger 32, conduit 39, vessel 40, and conduit 41 into chamber 13. The described flow of liquid from the generator to the absorber is caused by overflow from the upper end of conduit 37 into the absorber. The described flow of liquid from the absorber to the generator is caused by upward flow of liquid from a lower level in the absorber to a higher level in the generator through conduit 17 by thermosyphon or vapor liquid lift action.

Vapor expelled by heat in the generator as previously described flows from conduit 42 through the outside passage 33 of heat exchanger 32, and conduit 43 to the upper end of condenser 23. Vapor condenses to liquid in condenser 23 and the liquid flows from the condenser through conduit 28 into the upper part of evaporator 25. The liquid flows downward in evaporator 25, evaporating and diffusing into hydrogen gas, producing a refrigerating effect. The gas circulates in the described evaporator-absorber circuit. Ammonia vapor is absorbed out of the gas by absorption liquid in the absorber 21. The circulation of gas is caused by difference in specific weights of the weak and strong gas. Weak and strong gas are sometimes referred to as poor and rich gas.

In the heat exchanger 32, heat is transferred from weak solution flowing through center passage 35 to rich solution flowing in the opposite direction through the middle passage 34. Heat is also transferred from vapor flowing in outside passage 33 to rich solution flowing in the opposite direction through the middle passage 34. Heat transfer from vapor in the outside passage 33 is accompanied by condensation of water vapor. This is referred to as rectification.

The heat exchanger 32 is located below the surface levels of liquid in the generator-absorber liquid circuit. Condensate must therefore be removed from outside passage 33 to permit the flow of vapor therethrough and returned to the liquid circuit. The condensate drains from the lower end of outside passage 33 into conduit 45 and vessel 46. The liquid is raised from vessel 46 through conduit 48 into vessel 40 by upward flow of vapor through conduit 48 as previously described. In vessel 40 the condensate joins rich solution returning to the generator.

The surface levels of liquid in absorber 21 and vessel 40 are substantially the same. The surface level of liquid in generator standpipe 15 is lower than these levels by an amount equal to the head of liquid required for flowing the gas through liquid in vessel 46 into lower end of conduit 48. This level difference is substantially equal to the level of liquid in the left hand end of conduit 45 above the level of liquid in vessel 46.

Various modifications and changes may be made within the scope of the invention as set forth in the following claims.

What is claimed is:

1. An absorption refrigeration system including an absorber, a plurality of enclosures in which fluid therein is heated, members for circulation of absorption liquid through said obsorber and enclosures in series respectively, a second one of said enclosures and said members cooperating to cause said liquid circulation by thermosyphon or vapor lift action, means to conduct vapor from any or all of said enclosures in thermal exchange relation out of physical contact with absorption liquid flowing from said absorber toward said enclosures and below the surface level of liquid in said absorber, and means to elevate condensate from said vapor by vapor from a first one of said enclosures.

2. A system as in claim 1 also including means to join elevated condensate with absorption liquid flowing from said absorber toward said enclosures.

3. An absorption refrigeration system including a generator, an absorber, a thermosyphon or vapor lift for circulating absorption liquid between said generator and absorber, a conduit for vapor from said generator cooled by absorption liquid out of physical contact with the vapor and flowing toward said generator, means for heating absorption liquid flowing to said thermosyphon or vapor lift, and a second vapor lift utilizing vapor expelled by said heating to elevate condensate from said conduit.

4. A system as in claim 3 also having means to join elevated condensate with absorption liquid flowing toward said generator.

HUGO M. ULLSTRAND.